(12) United States Patent
Lord

(10) Patent No.: US 11,483,323 B2
(45) Date of Patent: Oct. 25, 2022

(54) TECHNIQUES AND/OR SYSTEMS TO MANAGE SECURE NETWORK CONNECTIONS

(71) Applicant: Oath, Inc., New York, NY (US)

(72) Inventor: Bob Lord, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 103 days.

(21) Appl. No.: 15/857,528

(22) Filed: Dec. 28, 2017

(65) Prior Publication Data

US 2019/0207963 A1 Jul. 4, 2019

(51) Int. Cl.
*H04L 29/06* (2006.01)
*H04L 9/40* (2022.01)

(52) U.S. Cl.
CPC ...... *H04L 63/1425* (2013.01); *H04L 63/0227* (2013.01); *H04L 63/0272* (2013.01); *H04L 63/1433* (2013.01); *H04L 63/20* (2013.01); *H04L 63/168* (2013.01)

(58) Field of Classification Search
CPC .............. H04L 63/0272; H04L 63/168; H04L 63/1425; H04L 63/0227; H04L 63/1433; H04L 63/20
See application file for complete search history.

(56) References Cited

U.S. PATENT DOCUMENTS

| 7,849,502 B1 * | 12/2010 | Bloch ................... H04L 63/168 726/11 |
| 8,856,869 B1 * | 10/2014 | Brinskelle ........... G06F 21/6218 726/2 |
| 9,419,942 B1 * | 8/2016 | Buruganahalli .... H04L 63/0236 |
| 2004/0015725 A1 * | 1/2004 | Boneh ................. H04L 63/0281 713/160 |
| 2016/0315923 A1 * | 10/2016 | Riscombe-Burton ........................ H04L 63/18 |

* cited by examiner

*Primary Examiner* — Baotran N To

(57) ABSTRACT

Briefly, embodiments, such as methods and/or systems for managing and/or monitoring secure network connections between endpoints without intervening between the endpoints, for example, are described.

20 Claims, 3 Drawing Sheets

TECHNIQUES AND/OR SYSTEMS TO MANAGE SECURE NETWORK CONNECTIONS

BACKGROUND

1. Field

This disclosure relates to networked computing devices (e.g., in communication via a computing and/or communications network).

2. Information

Organizations that provide Internet access from within an organization's network may face security risks, such as malware and/or other malicious traffic that may, for example, be transmitted into the organization, e.g. via its network. One factor potentially leading to difficulty in addressing these risks may include security protocols and/or specifications, such as "Transport Layer Security" (TLS) and its predecessor "Secure Sockets Layer" (SSL). See, e.g., TLS 1.2, IETF RFC 5246, August 2008. For example, because employees or others using a computing device that may connect to a private network, e.g. for an organization such as a corporation, may subject the private network to security risks, the organization, such as a corporation, for example, may want to monitor network activity. However, security protocols and specifications may present challenges to monitoring of network traffic.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
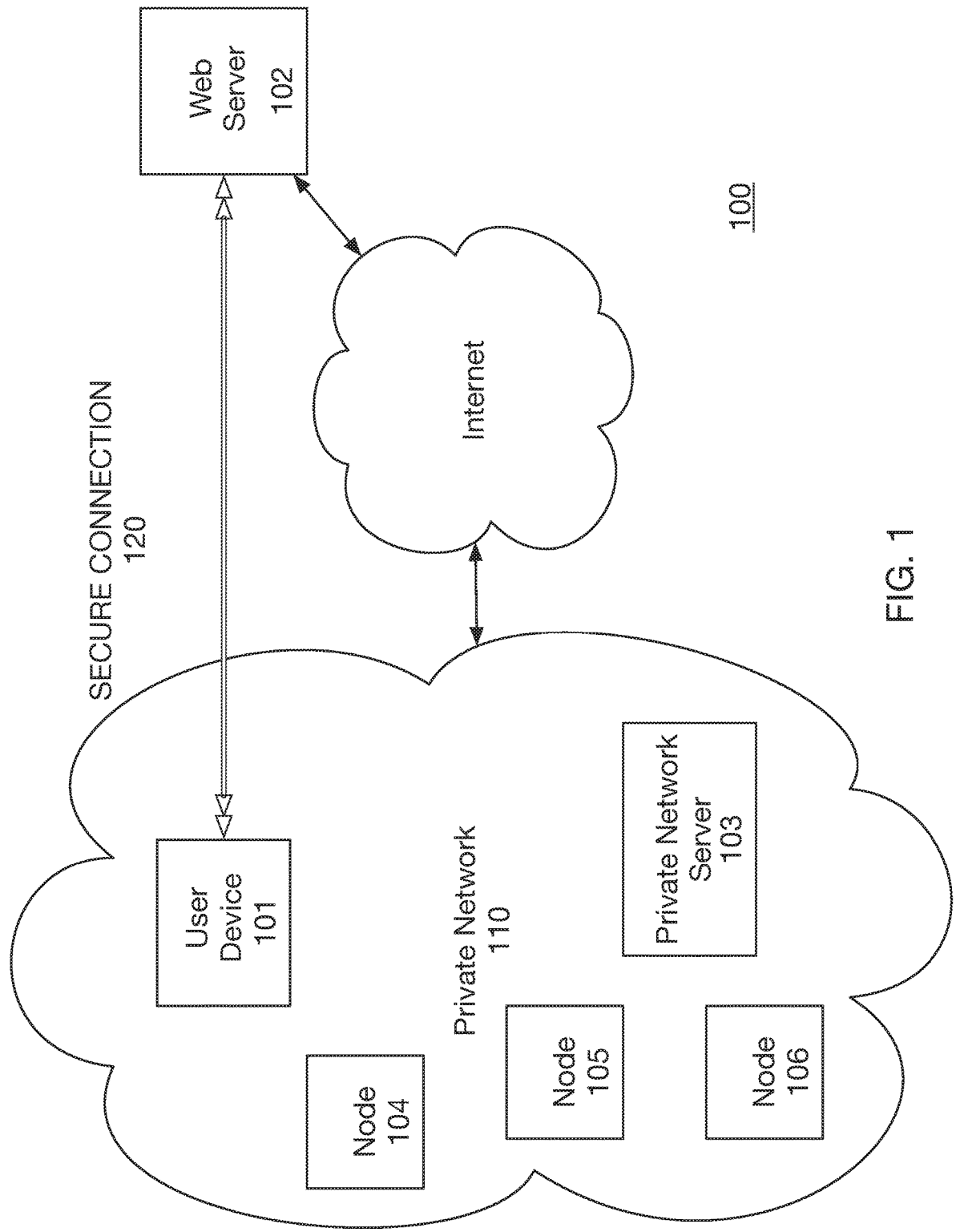
FIG. 1 is a block diagram showing an example embodiment of networked devices.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

For purposes of this disclosure, "TLS" will be used to designate all prior and/or future versions of TLS and/or SSL, such as TLS 1.2, IETF RFC 5246, August 2008. A TLS protocol may be employed in a variety of situations, such as to provide privacy and/or signal integrity, for example, between two communicating computer applications which may be executing on separate computing devices. The term "secure connection" as used in this document refers to a connection via a computing and/or communications network between an application executing on one computing device and an application executing on another computing device for which any portion of, or all, content being communicated via the connection is encrypted.

Secure connections may be used for communications, including transactions, that include sensitive and/or confidential content, such as, for example, financial, medical, and/or identity-related content. However, increasingly, a variety of websites are also using secure connections for communicating various content, for example. This may create difficulties for organizations that want to monitor network traffic, such as for malware and/or other cyber-threats. Content to be exchanged between a client and a server over a secure connection, for example, may be encrypted according to a TLS protocol.

A conventional approach is known as "TLS inspection" or "breaking" a TLS connection. These phrases will be used synonymously in this disclosure. Also, note that, as used herein, "client device" will be used interchangeably with "user device," and it is to be understood that a client device and/or user device is in and/or part of a private network that may include a private network server and/or a security server. The term "web server" is to be understood to refer to a server that is outside of, and/or external to, a private network that includes a client device and/or a private network server.

For example, in TLS inspection, a new "trusted certificate" may be installed on a client computing device. The "trusted certificate" may enable a client device to form a secure connection with a TLS inspection server. The TLS inspection server may be a server in the same private network as the client device. Upon or after a TLS connection is "broken," an application on a user device that initiated a secure connection with a web server corresponding to the URL, for example, will not proceed to form a secure connection with an application on that web server. Rather, if a user attempts to initiate a secure connection, for example, by entering a Uniform Resource Locator ("URL") into a browser application on a client device, the communication containing the URL is redirected to and intercepted by a TLS inspection server.

In this example, the user device interacts with the TLS inspection server as though it had a secure connection with the intended web server corresponding to the URL because of the new "trusted certificate" that was installed. However, the TLS inspection server acts as a proxy to form a secure connection with the web server indicated by the URL, and sends content to and receives content from, the web server, on behalf of the user device. The user device connects only to the TLS inspection server. In embodiments, a user may not be aware of this arrangement. Thus, organizations may use this or similar approaches to monitor network traffic with respect to the organization's network.

One potential disadvantage of "breaking" a TLS connection may be that it violates a user's sense of privacy. There may be other potential disadvantages of "breaking" TLS connections, such as unintentionally undermining network security. Additionally, in some cases, e.g. the Health Insurance Portability and Accountability Act ("HIPAA"), there may be potential to run afoul of governmental and/or other regulations regarding access to content, such as health-related content in the case of HIPAA, and/or other kinds of confidential content in this and/or in other cases.

Thus, a mechanism to permit some type of monitoring of network communications to address security risks, such as those mentioned, without necessarily "breaking" a TLS connection, may be desirable. For example, in accordance with an illustrative embodiment, it may be feasible to access at least a portion of (underlying) content, within an originating private network other than at a source node, to perform a security risk assessment, before underlying content exits the network. This may include situations in which (underlying) content is to be used by a source node to establish a secure connection with a node external to the private network, for example.

In this and other embodiments, a source node may be comprise a user device, such as a smartphone or laptop computer, and content may comprise a URL identifying a web server or web page with which a user desires to interact. After a user initiates a secure connection, such as with a web server or web page by, for example, entering a URL into a browser, a network policy of a private network in which a user device resides, may be invoked. According to network policy, in these illustrative, but non-limiting embodiments, a URL may be accessed, such as by a private network server of the private network, for a security threat assessment, before a secure connection proceeds. In some embodiments, the private network server of the private network may be a firewall. A firewall is a network security system that monitors and controls the incoming and outgoing network traffic based on predetermined security rules. A firewall typically establishes a barrier between a trusted, secure internal network and another outside network, such as the Internet, that may not be secure.

A private network server accesses content from a user device by a connection that is separate from and will have no overlap with, a secure connection between a user device and a web server, should a security threat assessment permit an initiated secure connection to proceed. That is, a private network server that accesses content, in this illustrative example, is not, and will not be, an intervening node between a user device and a web server, should the security threat assessment permit a secure connection to proceed.

This is in contrast to "breaking" a TLS connection, as described above, where content intended to be communicated to a web server to initiate a secure connection, for example, is intercepted and redirected to a TLS inspection server which acts as a proxy. If the TLS connection is "broken" there neither is nor will be a secure connection between a source node and an external destination node because the TLS inspection server intervenes.

Other embodiments are directed to providing a notification to a user device that at least a portion of (underlying) content is being accessed, such as within a private network, other than at a source node, to perform a security risk assessment, for example. Before underlying content exits a private network, content to be used to establish a secure connection with a node external to the network, may be accessed. For example, in an illustrative embodiment, a notification to a user may be displayed that a desired website is outside of the private network and that a security threat assessment is to be performed. A user device may also provide a prompt requesting that a user indicate whether to continue with the security threat assessment, or whether a user desires to cancel the communication (e.g. before it takes place).

These, and other illustrative embodiments, will now be more particularly described with reference to the figures.

FIG. 1 shows an illustration of an example embodiment in accordance claimed subject matter; however, it is noted that claimed subject matter is not intended to be limited to examples provided for purposes of illustration. In particular, FIG. 1 shows a block diagram of the high-level network architecture of an illustrative embodiment. FIG. 1 shows user device 101 and private network server 103, which are part of private network 110, and web server 102 connected to the Internet. As mentioned, FIG. 1 is illustrative and meant to assist in understanding claimed subject matter, but is not limiting in that regard.

Nodes 101-106, for example, comprise, respectively, networked computing devices (e.g., computing devices in communication via a computing and/or communications network). In an embodiment, such as shown in FIG. 1, node 101 comprises a user device, such as, for example, a laptop computer, a desktop computer, a cell phone, and/or any other user computing device. Of course, as previously explained, claimed subject matter is not limited in this respect. In an embodiment, user device 101 may include a browser application to interact with the Internet or the World Wide Web (the "Web").

User device 101 is included in private network 110. Private network 110 may comprise an intranet, or a subset thereof, of a corporation or other business entity, such as an educational institution, or other organization. An intranet may comprise a local area network (LAN) for a small office, or a complex collection of LANs in a large enterprise, to give a few examples. In an illustrative embodiment, nodes 104-106 are also included in to private network 110. These are just illustrative examples and, thus, are not meant to limit claimed subject matter, as explained.

In an illustrative embodiment, node 102 comprises a web server external to private network 110. For example, web server 102 comprises a computing device connected to the Internet that is capable communications, such as, for example, receiving requests for web pages, documents, files, web services and the like, and providing, web pages, documents, files, services, and the like.

In an embodiment, node 103 comprises a private network server providing network security services and included in private network 110. Private network server 103 may be dedicated to providing network security services, or it may provide additional computing and/or communications services. In an embodiment, node 103 may comprise a physical or a logical server. Network security services provided by private network server 103 may include securing an organization's computing, content storage, and/or electronic infrastructure, and may further include providing firewalls, email security, web security, and/or other cyber-threat security. In an embodiment, private network server 103 may, in effect, push network security policies to all, or some subset, of computing devices included in private network 110, such as user computing device 101. For example, executable instructions to implement network security policies may be loaded in this manner.

The term "network security policies" refers to sets of conditions, constraints, and/or settings that may typically be provided by administrators of a managed network, often implemented via executable instructions, to designate who is authorized to connect to the managed network, user permissions, and/or other aspects and circumstances under which connection to the managed network may be permissible. Examples of network security policies may include, without limitation, email policies, remote access policies, personal phone and device policies, password policy, and/or risk assessment policy.

Figure 2:
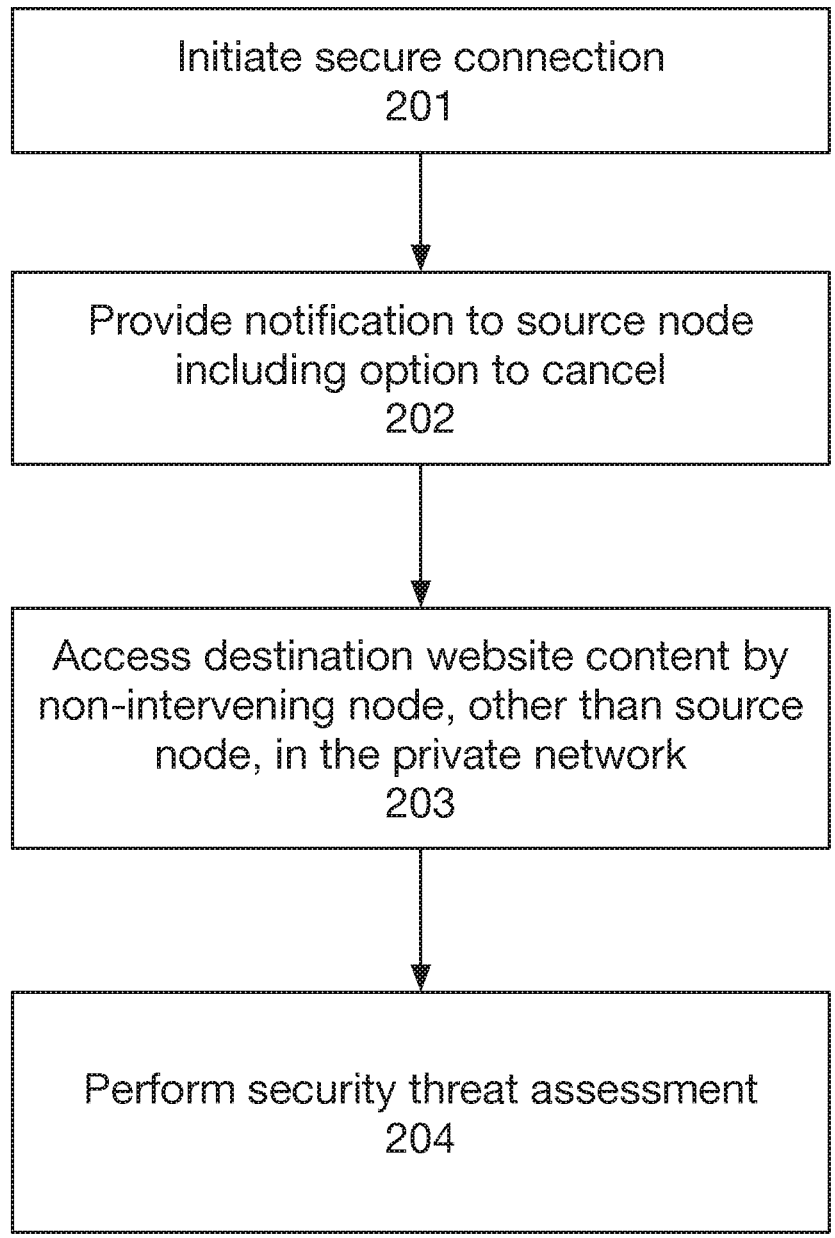
FIG. 2 is a flow chart of an embodiment of a technique to manage secure network connections.

FIG. 2 is a flow chart of an embodiment of a technique to manage secure network connections. At block 201, a secure connection may be initiated from a node on a private network. For example, a user may initiate a secure connection to web server 102 by entering a destination URL into a browser running on user device 101. In embodiments, a user may also enter confidential content such as health-related content, passwords, identity questions, trade secrets, and the like. However, claimed subject matter is not limited in this respect. As also described above, for security of the connection, content is, in general, encrypted before it is communicated and authenticity of the parties as the origin of their respective communications is, in general, verified.

At block 202, notification may be provided to a source node that initiated a secure connection with a web server. The notification may provide an option to cancel the initiated secure connection. For example, in an embodiment, notification may be provided on a display of user device 101 that a security assessment is to be performed before a communication exits the private network. In an embodiment, as mentioned, there may be an option to cancel the operation. A notification may state that in order to assess a security threat, a URL, and at least portions of content to be exchanged between user device 101 and web server 102, will be assessed for security risks before a user will be allowed to connect to a website corresponding to the URL.

As mentioned, in an embodiment, user device 101 may present a choice to continue, for example, given conditions set forth, or to cancel the operation. This may be perceived more positively by a user, rather than monitoring without notification. Claimed subject matter, however, is not limited in this respect.

At block 203, a destination URL (e.g. website) may be accessed by a non-intervening node on a private network, that is, a node that does not otherwise intervene in a path of an initiated secure connection. For example, network security policy may include instructions to access the destination website without an intervention or redirection of the initiated secure connection. In an embodiment, private network server 103 executes network security policies. As mentioned earlier, there may be security risks associated with connecting to external computing devices. For example, an organization, such as a corporation or educational institution may put measures in place to manage network security risks.

A variety of approaches exist to assess network security, and claimed subject matter is not limited in scope in this respect. For example, private network server 103 may be provided with a destination URL in accordance with network security policy. As discussed in more detail below, private network server 103 may use this content (e.g. a destination URL) to assess security risk of connecting to and communicating with a destination web server corresponding to a destination URL. If, for example, assessed risk is deemed acceptable, an initiated secure connection may be allowed to proceed. For example, in an embodiment, if the assessed security risk is deemed too high, an initiated connection may be prevented or otherwise managed so that the private network does not become compromised. Again, however, the claimed subject matter is not limited in this respect.

At block 204, a security threat assessment may be performed based, at least in part, on the accessed content. For example, a URL entered into the user device may be accessed by private network server 103 to perform a security threat assessment. In an embodiment, private network server 103 may include executable instructions to perform tasks comprising a security threat assessment. For example, there may be a list of network domains and/or websites that may pose a security threat. Such lists may be updated from time-to-time, or frequently, in various embodiments. Private network server 103 may comprise executable instructions to compare the domain of a destination URL to the list of network domains that potentially pose a security threat, and if present, as mentioned, the secure connection can be prevented or otherwise managed, so that connection does not occur. In addition, or alternatively, a destination URL may be loaded into a browser on private network server 103, and a secure connection request generated. By doing this in a secured environment, content may be received from a corresponding destination server. Private network server 103 may comprise executable instructions to assess content obtained, which may include a comparison with known malware-type content known bad content which may pose a security risk. Again, if present, a connection may be prevented, terminated and/or otherwise managed, for example by quarantining any content posing a security risk. Further, in addition or alternatively, private network server 103 may comprise executable instructions to download any content that may be linked to the destination server for similar security risk assessment.

As noted above, in various embodiments, private network server 103 may prevent, terminate, or otherwise manage a connection to reduce and/or eliminate security risks. For example, in an embodiment, private network server 103 may operate in a blocking or a non-blocking mode. In a blocking mode, for example, private network server 103 may prevent a connection between user device 101 and a destination URL until an acceptable level of security risk has been determined. In a non-blocking mode, private network server 103 may allow user device 101 to initiate and establish a connection to a destination URL before the security determination is made or completed. However, if a security determination reveals risk, such as malware-type content, then IT administrators may designate user device 101 as compromised, and may quarantine user device 101.

In an embodiment, private network server may include executable instructions to permit connections when risks are known or likely to be low. For example, there may be certain types of URLs, or certain specific URLs, that need not be inspected, such as banking web sites, well-known shopping sites, health-related web sites, (which may involve sensitive and/or confidential information), but will likely pose a low security risk. Likewise, in an embodiment, limited portions of a URL, or limited portions of available content may be obtained from user device 101 by private network server 103 for security inspection.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively, reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present disclosure, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 3:
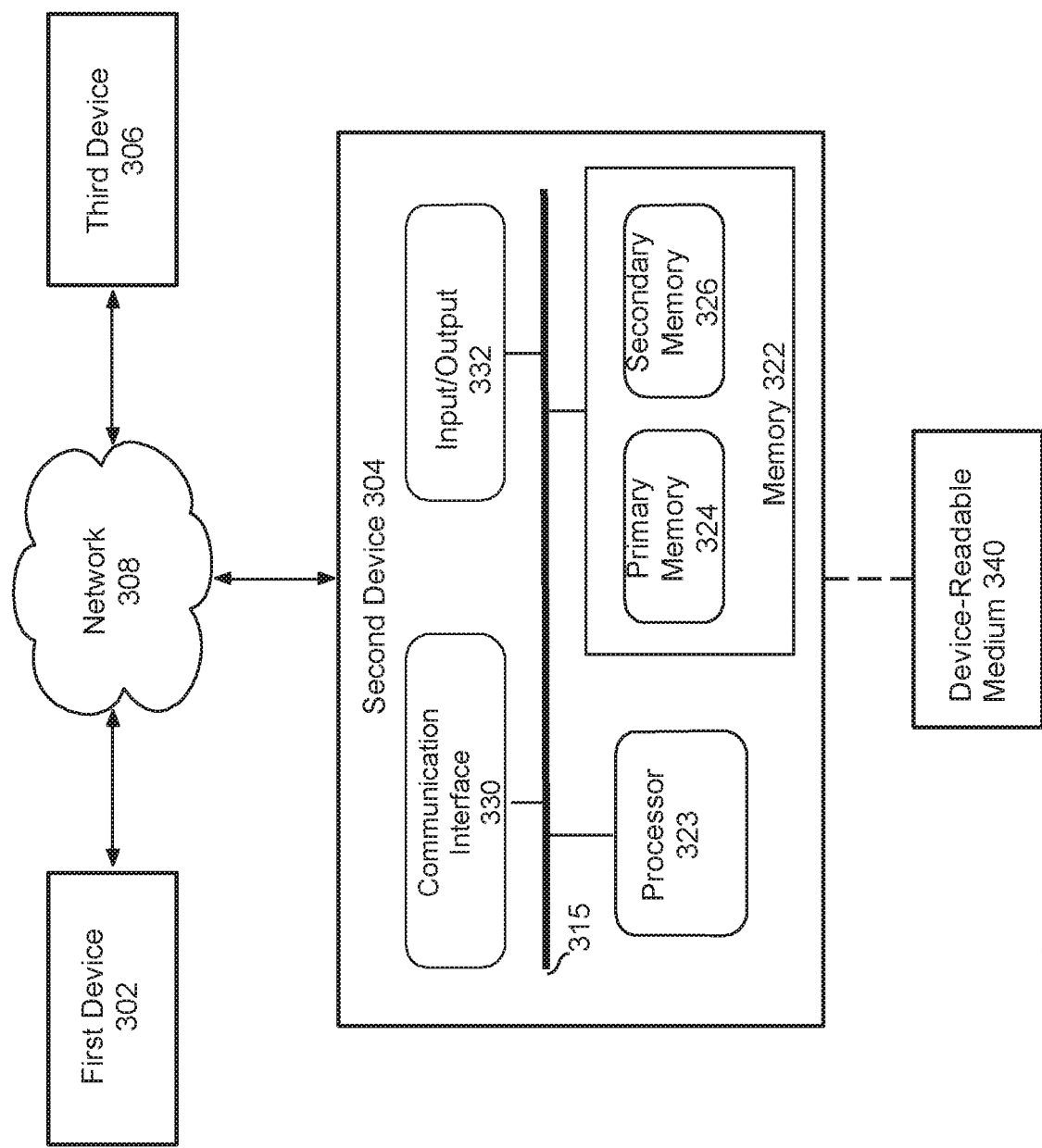
FIG. 3 is an illustration of an embodiment of a system in a networking and/or computing environment.

In one example embodiment, as shown in FIG. 3, a system embodiment may comprise a local network (e.g., device 304 and medium 340) and/or another type of network, such as a computing and/or communications network. For purposes of illustration, therefore, FIG. 3 shows an embodiment 300 of a system that may be employed to implement either type or both types of networks. Network 308 may comprise one or more network connections, links, processes, services, applications, and/or resources to facilitate and/or support communications, such as an exchange of communication signals, for example, between a computing device, such as 302, and another computing device, such as 306, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 3 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in (i) the foregoing paragraphs that discuss FIG. 2 and (ii) FIG. 2 of the present disclosure.

Referring now to FIG. 3, in an embodiment, first and third devices 302 and 306 may be capable of rendering a graphical user interface (GUI) for a network device and/or a computing device, for example, so that a user-operator may engage in system use. Device 304 may potentially serve a similar function in this illustration. Likewise, in FIG. 3, computing device 302 ('first device' in figure) may interface with computing device 304 ('second device' in figure), which may, for example, also comprise features of a client computing device and/or a server computing device, in an embodiment. Processor (e.g., processing device) 320 and memory 322, which may comprise primary memory 324 and secondary memory 326, may communicate by way of a communication bus 315, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 304, as depicted in FIG. 3, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 3, computing device 302 may provide one or more sources of executable computer instructions in the form physical states and/or signals (e.g., stored in memory states), for example. Computing device 302 may communicate with computing device 304 by way of a network connection, such as via network 308, for example. As previously mentioned, a connection, while physical, may not necessarily be tangible. Although computing device 304 of FIG. 3 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 322 may comprise any non-transitory storage mechanism. Memory 322 may comprise, for example, primary memory 324 and secondary memory 326, additional memory circuits, mechanisms, or combinations thereof may be used. Memory 322 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 322 may be utilized to store a program of executable computer instructions. For example, processor 320 may fetch executable instructions from memory and proceed to execute the fetched instructions. Memory 322 may also comprise a memory controller for accessing device readable-medium 340 that may carry and/or make accessible digital content, which may include code, and/or instructions, for example, executable by processor 320 and/or some other device, such as a controller, as one example, capable of executing computer instructions, for example. Under direction of processor 320, a non-transitory memory, such as memory cells storing physical states (e.g., memory states), comprising, for example, a program of executable computer instructions, may be executed by processor 320 and able to generate signals to be communicated via a network, for example, as previously described. Generated signals may also be stored in memory, also previously suggested.

Memory 322 may store electronic files and/or electronic documents, such as relating to one or more users, and may also comprise a device-readable medium that may carry and/or make accessible content, including code and/or instructions, for example, executable by processor 320 and/ or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general-purpose computing and/or network device, such as a general-purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 3, processor 320 may comprise one or more circuits, such as digital circuits, to perform at least a portion of a computing procedure and/or process. By way of example, but not limitation, processor 320 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 320 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 3 also illustrates device 304 as including a component 332 operable with input/output devices, for example, so that signals and/or states may be appropriately communicated between devices, such as device 304 and an input device and/or device 304 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method comprising:
accessing, by a private network server within a private network, at least a portion of source node content within the private network before the source node content exits the private network via a source node, wherein the source node content is indicative of an attempt to initiate a secure connection between the source node and a destination node external to the private network;
responsive to the accessing at least the portion of the source node content, performing a security threat assessment of the destination node based on the source node content, wherein the security threat assessment comprises accessing, by the private network server, the destination node via a second connection that is separate from the secure connection;
determining, based on the security threat assessment comprising the accessing by the private network server of the destination node via the second connection, whether to permit the secure connection between the source node and the destination node without the private network server being an intervening node in the secure connection; and
responsive to determining to permit the secure connection between the source node and the destination node without the private network server being an intervening node based on the security threat assessment that comprised the accessing by the private network server of the destination node via the second connection that is separate from the secure connection:
allowing, by the private network server, establishment of the secure connection between the source node and the destination node without the private network server being an intervening node, between the source node and the destination node, in the secure connection.

2. The method of claim 1, comprising:
accessing, by the private network server within the private network, at least a portion of second source node content within the private network before the second source node content exits the private network via a second source node, wherein the second source node content is indicative of a second attempt to initiate a second secure connection between the second source node and a second destination node external to the private network;
responsive to the accessing at least the portion of the second source node content, performing a second security threat assessment of the second destination node based on the second source node content, wherein the second security threat assessment comprises accessing, by the private network server, the second destination node;
determining whether to permit the second secure connection between the second source node and the second destination node based on the second security threat assessment comprising the accessing, by the private network server, of the second destination node; and
responsive to determining to not permit the secure connection between the second source node and the second destination node, preventing communication of the second source node content, indicative of the second attempt to initiate the second secure connection between the second source node and the second destination node, to the second destination node.

3. The method of claim 1, the secure connection comprising a Transport Layer Security (TLS) connection.

4. The method of claim 1, the secure connection comprising a Secure Sockets Layer (SSL) connection.

5. The method of claim 1, wherein:
the security threat assessment comprises receiving, by the private network server, content from the destination node via the second connection that is separate from the secure connection after the accessing by the private network server of the destination node; and the determining whether to permit the secure connection between the source node and the destination node is based on the content received by the private network from the destination node via the second connection that is separate from the secure connection.

6. The method of claim 1, the private network server separate from the secure connection between the source node and the destination node.

7. The method of claim 1, the accessing performed based on a network policy.

8. The method of claim 1, comprising providing a notice communication to the source node.

9. A computing device comprising:
one or more processors; and
memory comprising instructions that, when executed by the one or more processors, perform operations comprising:
accessing, by a private network server within a private network, at least a portion of source node content within the private network before the source node content exits the private network via a source node, wherein the source node content is indicative of an attempt to initiate a secure connection between the source node and a destination node external to the private network;
responsive to the accessing at least the portion of the source node content, performing a security threat assessment of the destination node based on the source node content, wherein the security threat assessment comprises accessing, by the private network server, the destination node via a second connection that is separate from the secure connection; and
determining, based on the security threat assessment comprising the accessing by the private network server of the destination node via the second connection, whether to permit the secure connection between the source node and the destination node without the private network server intervening between the source node and the destination node in the secure connection.

10. The computing device of claim 9, the operations comprising:
responsive to determining to permit the secure connection between the source node and the destination node, communicating the source node content, via the secure connection, to the destination node.

11. The computing device of claim 9, the operations comprising:
responsive to determining to not permit the secure connection between the source node and the destination node, preventing communication of the source node content to the destination node.

12. The computing device of claim 9, the secure connection comprising at least one of a Secure Sockets Layer (SSL) connection or a Transport Layer Security (TLS) connection.

13. A non-transitory device-readable medium comprising instructions that, when executed by a processor, perform operations comprising:

accessing, by a private network server within a private network, at least a portion of source node content from a source node within the private network, wherein the source node content is indicative of an attempt to initiate a secure connection between the source node and a destination node external to the private network;
responsive to the accessing at least the portion of the source node content, performing a security threat assessment of the destination node based on the source node content, wherein the security threat assessment comprises accessing the destination node via a second connection that is separate from the secure connection; and
determining, based on the security threat assessment comprising the accessing of the destination node via the second connection, whether to permit the secure connection between the source node and the destination node, wherein the private network server does not intervene between the source node and the destination node, in the secure connection, if the secure connection is permitted.

14. The non-transitory device-readable medium of claim 13, the operations comprising:
accessing, by the private network server within the private network, at least a portion of second source node content within the private network before the second source node content exits the private network via a second source node, wherein the second source node content is indicative of a second attempt to initiate a second secure connection between the second source node and a second destination node external to the private network;
responsive to the accessing at least the portion of the second source node content, performing a second security threat assessment of the second destination node based on the second source node content; and
determining whether to permit the second secure connection between the second source node and the second destination node based on the second security threat assessment.

15. The non-transitory device-readable medium of claim 13, the secure connection comprising a Transport Layer Security (TLS) connection.

16. The non-transitory device-readable medium of claim 13, the secure connection comprising a Secure Sockets Layer (SSL) connection.

17. The non-transitory device-readable medium of claim 13, the source node comprising a computing device including executable instructions for a browser.

18. The non-transitory device-readable medium of claim 13, the private network server separate from the secure connection between the source node and the destination node.

19. The non-transitory device-readable medium of claim 13, the accessing performed based on a network policy.

20. The non-transitory device-readable medium of claim 13, the operations comprising providing a notice communication to the source node.

* * * * *